(12) United States Patent
Haddadi

(10) Patent No.: US 10,101,598 B2
(45) Date of Patent: Oct. 16, 2018

(54) LOCATING DEVICE INTENDED TO BE FIXED TO A SPECTACLE FRAME

(71) Applicant: ESSILOR INTERNATIONAL (COMPAGNIE GENERALE D'OPTIQUE), Charenton-le-Pont (FR)

(72) Inventor: Ahmed Haddadi, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 97 days.

(21) Appl. No.: 14/377,262

(22) PCT Filed: Feb. 4, 2013

(86) PCT No.: PCT/FR2013/050227
§ 371 (c)(1),
(2) Date: Aug. 7, 2014

(87) PCT Pub. No.: WO2013/121128
PCT Pub. Date: Aug. 22, 2013

(65) Prior Publication Data
US 2015/0002807 A1 Jan. 1, 2015

(30) Foreign Application Priority Data
Feb. 16, 2012 (FR) ...................... 12 51417

(51) Int. Cl.
G02C 13/00 (2006.01)
G02C 11/00 (2006.01)

(52) U.S. Cl.
CPC .............. *G02C 13/00* (2013.01); *G02C 11/10* (2013.01); *G02C 13/003* (2013.01); *G02C 13/005* (2013.01)

(58) Field of Classification Search
CPC .... G02C 13/005; G02C 13/003; G02C 13/00; G02C 11/10; A61B 3/111
(Continued)

(56) References Cited

U.S. PATENT DOCUMENTS

| 5,155,508 A | * | 10/1992 | Onufryk | G02C 13/003 351/158 |
| 2007/0195266 A1 | * | 8/2007 | Kubitza | G02C 13/005 351/204 |
| 2010/0195045 A1 | * | 8/2010 | Nauche | G02C 13/005 351/204 |

FOREIGN PATENT DOCUMENTS

| CN | 201466613 U | 5/2010 |
| FR | 2526653 | 11/1983 |

(Continued)

OTHER PUBLICATIONS

International Search Report dated 2012.
International Search Report issued in Application No. PCT/FR2013/050227, dated Jul. 26, 2013.

*Primary Examiner* — Jie Lei
*Assistant Examiner* — Mitchell Oestreich
(74) *Attorney, Agent, or Firm* — Young & Thompson

(57) ABSTRACT

The invention relates to a referencing device (1, 100) intended to be fixed to an eyeglass frame in order to spatially reference said frame, said device (1, 100) having a transverse bar (2, 102), a central extension (5), two lateral markers (3) and a central marker (4), each marker (3, 4) consisting of a light area (12) and a darker area (11). The main characteristic of a clip according to the invention is that it comprises at least one mobile fastening member (7, 8) which is able to move along at least one slide (9, 10) of the bar (2, 102).

15 Claims, 3 Drawing Sheets

(58) Field of Classification Search
USPC .......................................................... 351/155
See application file for complete search history.

(56) References Cited

FOREIGN PATENT DOCUMENTS

FR         2 906 047 A1    3/2008
WO     2008/129168 A1   10/2008

* cited by examiner

LOCATING DEVICE INTENDED TO BE FIXED TO A SPECTACLE FRAME

RELATED APPLICATIONS

This application is a National Phase Application of PCT/FR2013/050227, filed on Feb. 4, 2013, which in turn claims the benefit of priority from French Patent Application No. 12 51417 filed on Feb. 16, 2012, the entirety of which are incorporated herein by reference.

BACKGROUND

Field of the Invention

The invention relates to a locating device for a spectacle frame. The context of the invention is in the measurement of morphogeometric parameters on an individual who wears corrective spectacles. Specifically, spectacles having corrective lenses have overall shapes that vary in terms for example of curvature and height and must be adaptable precisely and accurately to the morphology of a face and to the relative position of an individual's eyes through, for example, the inter-pupil distance. These pairs of spectacles also have to be designed so as to take into account the more or less marked degree of inclination of the head when an individual is made to read close up, or to look into the distance, in a natural comfortable posture.

Description of Related Art

The characteristics of these spectacles are determined by means of measurement processes that involve a spectacles wearer being placed in a situation of close-up and/or distance reading, in a natural comfortable position, generally with no constraint on posture. These processes are based on the capturing of images of the face by way of an image acquisition apparatus in order to determine a number of morphogeometric parameters, for example a lens height or a pantographic angle, said parameters serving to design a pair of spectacles that is as suitable as possible for the individual in question. Although these processes are quick and easy to implement, and although they are ergonomic and user-friendly with respect to the individual tested, they can sometimes appear to be relatively imprecise in terms of the results they provide, inasmuch as it can prove difficult to precisely locate the positioning of the frame on the exposures obtained, and also that of particular elements of the face, for example the pupils. A preferred solution consists in using a locating device, in the form of a clip, which is temporarily fixed to the frame and which bears a number of markers in order to make three-dimensional location of said frame on the exposures obtained during these measurement processes easier. However, existing locating devices have a fixed geometry and are provided with fixed means for connecting to the frame, making them not very adaptable to frames having different geometries and sizes. As a result, these locating devices can be found to be highly misaligned with respect to the frame which they are intended to represent, and cause substantial errors in the measurements obtained.

OBJECTS AND SUMMARY

A locating device according to the invention is designed to be securely attached in a satisfactory manner to any type of spectacle frame, with or without a curvature, and having a greater or lesser lens height. Specifically, it is equipped with means for fixing to the frame which allow it to remain close to the plane of the lenses of the frame and thus to perfectly represent said frame in space. It helps to make it easier to carry out the measurement processes since it avoids the realization of a step of selecting the most suitable locating device for the pair of spectacles in question, being designed to be fitted to any type of frame. For the sake of clarity, it should be noted that the term "frame" is general and can denote equally a rimless, rimmed or semirimless pair of spectacles. Similarly, the terms "front", "rear", "upper", "lower" and "lateral" that are applied to the clip should be interpreted as if said clip were fixed to a frame and the frame were itself positioned on the face of an individual in a more or less vertical position.

The subject of the invention is a locating device intended to be fixed to a spectacle frame in order to spatially locate said frame, said device having a transverse bar, a central extension, two lateral markers and a central marker, each marker consisting of a light area and a darker area. The main characteristic of a locating device according to the invention is that it comprises at least one mobile fixing member that is able to move along at least one slideway on the bar. A fixing member forms part of the locating device that is intended to form the point of contact between said device and a given frame in order to attach said device to said frame. Thus, each mobile fixing member may be moved on the locating device such that it is possible to fix said device in a satisfactory manner to a given spectacle frame, characterized by its curvature and the height of its lenses, and such that it is positioned at the level of the pupils. Specifically, it is essential that the locating device be as close as possible to the plane of the lenses in the frame, regardless of the curvature of said frame, so as to be able to precisely and reliably represent said frame in space. With a locating device that has fixed fasteners, the risk of having a significant misalignment between the plane of the lenses for a very curved frame and said device is high. The fact that it has mobile fixing members makes it possible to position the locating device in a satisfactory manner on any type of frame, as close as possible to the pupils. It is assumed that the interaction between each fixing member and each slideway allows said member to remain fixed in its position. Each mobile member may take any shape and may even be colored so as to appear visible on a film or on a photograph. The fixed markers and the central extension are conventional features of a device for locating a frame in space. In this respect, the central extension is similar to a projection which protrudes toward the front of an individual's face when he is wearing spectacles equipped with a locating device, and gives the locating device a somewhat more three-dimensional geometry. It makes it possible in particular to locate the frame better in space when the individual's head is inclined.

Advantageously, the transverse bar is provided with two rectilinear slideways that extend along a longitudinal axis of said bar so as to allow two mobile fixing members to move. Once the frame equipped with the locating device is being worn on the more or less vertical face of an individual, the bar is positioned above the lenses and extends in a transverse and approximately horizontal direction. In this way, the two mobile members move in translation above each lens in a horizontal direction. The objective of the presence of these two fixing members, in addition to ensuring correct positioning of the locating device on the frame regardless of the shape and height thereof, is also to be able to easily and precisely locate the position of each pupil of the individual on an exposure or a film. It is thus important to be able to easily and rapidly locate said fixing members on an exposure, either by assigning them a particular shape that is easily identifiable or by coloring them, or by combining these two characteristics. It should be noted that the positions of the two fixing members on the bar can be adjusted, either independently of one another or in conjunction with one another, wherein when one is moved outward or inward, this causes the other to be moved outward or inward.

Advantageously, the two fixing members are adjustable independently of one another in order to represent the position of each pupil. Since the fixing members are particularly visible on an image, such as a photograph or a film, they can also serve to improve the locating of the pupils of an individual.

Preferentially, each mobile fixing member is a shoe provided with a nonslip material, each of said shoes being designed to come into contact with the upper part of the frame. Each fixing member forms a point of contact with the frame, and the nonslip material is intended to prevent the locating device from shifting on said frame during the measurement process.

Advantageously, each shoe has two legs that are intended to be positioned on each side of the frame, the nonslip material being placed on those areas of each leg that are opposite one another. In this way, not only can said shoes be set along each slideway of the bar in order to ensure representative fixing of the locating device on a frame and to mark the position of each pupil, but they also act as a guide member for allowing the locating device to be affixed correctly to the frame. Preferentially, each shoe is V-shaped.

Advantageously, the locating device according to the invention has two lateral lever arms that are each placed at one end of the bar, each of said lever arms being able to be moved in the plane of the frame so as to adapt to a given frame length, and being nondeformable in a direction perpendicular to said plane. The mobile fixing members allow the device to come into contact with the upper part of the frame, while the two lateral lever arms allow said locating device to make lateral contact with said frame. The movement of the lever arms makes it possible to adapt the spacing of the locating device to that of the frame so as to promote contact between these two elements. The arms may move in translation or in rotation. The movement may also be ensured by an elastic deformation of said arms, the contact between the device and the frame being produced when said arms relax in order to return to their initial shape. Each lever arm cannot deform in a direction perpendicular to the frame, so as to avoid a misalignment between the locating device and the frame, which would result in nonrepresentative positioning of the device or in disconnection of said device and said frame. According to a preferred embodiment of a locating device according to the invention, each lever arm is formed by a leaf spring that is nondeformable in a direction perpendicular to the plane of the frame, in order to keep the frame in a position similar to the one it would take up in the absence of the locating device. Each lateral lever arm must not be designed to belp to incline the frame further than its natural position in the absence of the locating device.

Preferentially, each lever arm ends with a secondary nonslip shoe that is designed to come into contact with the lower part of the frame, each shoe having two legs that are intended to be placed on each side of the frame. In this way, by virtue of these lever arms, the locating device clamps the frame both laterally and from below. Combined with the mobile markers which bear against the upper part of the frame, the locating device clamps the frame in the three main directions of space.

Preferentially, one leg of each upper shoe and one leg of each lower shoe is positioned perpendicularly to the bar so as to avoid a misalignment between said device and the frame. When the locating device is placed on a frame, which is itself worn on the face of an individual, each leg perpendicular to the bar extends in an approximately vertical direction, each of said legs acting as a blocking abutment so as to avoid a misalignment between the position of the locating device and the plane of the frame.

According to a first preferred embodiment of a locating device according to the invention, each lever arm has a rounded shape and is elastically deformable, said lever arms being able to be moved apart in order to fit on a wider frame. The rounded profile of each lever arm facilitates contact between the locating device and the generally rounded contour of the frame. The close contact between the locating device and the frame occurs in the region of these lever arms, which tend to return to their initial shape after having been moved apart.

According to a second preferred embodiment of a locating device according to the invention, each lever arm has a rounded shape and is mounted so as to pivot on the bar. Rather than being deformed elastically, each arm can thus pivot through a relatively large or small angle while retaining its initial shape, in order to fit on a frame having a given geometry and size. The movement of the arms occurs naturally, without bringing about any elastic deformation.

Advantageously, each lever arm is mounted rotatably on the bar by way of a connecting segment that can take up two rotational positions. With such mounting, the locating device can adopt a first, widened configuration and a second, narrower configuration, the adoption of a configuration being dictated by the dimensions, the geometry and the curvature of the frame.

Advantageously, each lever arm is formed from two parts that are connected together by an articulated connection. This configuration increases the precision of mounting the locating device on the frame, involving lever arms that are subdivided into two rotary segments of small dimensions.

Preferentially, the bar has two rectilinear segments that have identical lengths and form an angle between one another, said two angled segments and also the central extension then being positioned in the same plane. That is to say, the locating device is designed either with a nonremovable bar, which may be rectilinear or composed of two inclined segments, or with an adjustable bar in order to pass from a rectilinear configuration to a configuration with two inclined segments. For this configuration, the bar may be formed by two rectilinear segments that are connected together by means of an articulated connection, said bar being able to be converted from a perfectly rectilinear object to an object having two more or less inclined segments. Generally, frames are curved in a symmetrical manner and, in order that the locating device adapts to this symmetry, the bar is provided with two segments in a symmetrical position with respect to the central extension.

Advantageously, the angle between the two segments is between 180° and 130°.

A second subject of the invention relates to a support for a locating device according to the invention. The main characteristic of a support according to the invention is that it comprises at least one face that is provided with an orifice for receiving the central extension of said device, said device being placed against the support such that the plane in which the bar and the two lever arms are inscribed is positioned parallel to said face. Such a support is intended to make it easier to mount a locating device according to the invention on a frame, by means of quick and easy handling, not requiring any particular effort. Such a support also makes it possible to avoid handling the locating device on the frame once the latter has been placed on the individual's face, it being possible for this type of operation to prove risky and unhygienic. The face of the support may for example be planar or may consist of two planar parts that are inclined with respect to one another. In the first case, the support will be suitable for a locating device provided with a virtually rectilinear bar. In the second case, it will be suitable more ford locating device that has a bar consisting of two segments that are inclined with respect to one another. One and the same support may also be designed with both types of surface at the same time.

Advantageously, the support comprises means for retaining said locating device. Specifically, the configuration in which the support is in a vertical position, being for example attached to a wall, may prove to be advantageous. It is thus important to be able to keep the locating device in the support in a vertical position. These retaining means may be of any type, for example mechanical, magnetic or electrical.

The invention also relates to a method for mounting a locating device according to the invention on a frame, said device being fixed beforehand to a support according to the invention. The main feature of a mounting method according to the invention is that it comprises the following steps of:

manually grasping the frame at its temples, then carrying said frame to the locating device held against the support, presenting the frame in an inclined position with respect to the locating device in order to insert the upper part of said frame into the two nonslip shoes of the locating device, rotating the frame in order to insert its lower part into the secondary shoes of each lever arm, removing the frame equipped with the locating device.

Such a mounting method is carried out easily in a continuous movement. The individual supplies his frame in an inclined manner with respect to the locating device, then imparts a simple rotational movement in the same direction so as first of all to place the upper part of the frame between the nonslip shoes and then to insert the lower part of said frame into the secondary shoes of the lever arms. Once the lenses of the frame are positioned more or less parallel to the face of the support, the individual removes his frame equipped with the locating device by sliding the central extension out of the orifice.

The locating devices according to the invention have the advantage of allowing processes for measuring morphogeometric parameters of an individual, these being more reliable, more precise and thus more efficient by affording a more complete service through its adjustable fixing means, and being able to adapt to a plurality of frames having different shapes, curvatures and heights. In this way, the locating device remains close to the plane of the lenses of the frame and ensures good representativeness of the frame in space. They additionally have the advantage of having, through their mobile fixing member, means for locating each pupil, since once the locating device is fixed to the frame, their position corresponds very closely to that of the individual's pupils.

BRIEF DESCRIPTION OF THE DRAWINGS

A detailed description of a preferred embodiment of a locating device according to the invention and also of a method for fixing such a device on a frame is given below with reference to FIGS. 1 to 5c.

DETAILED DESCRIPTION

Figure 1:
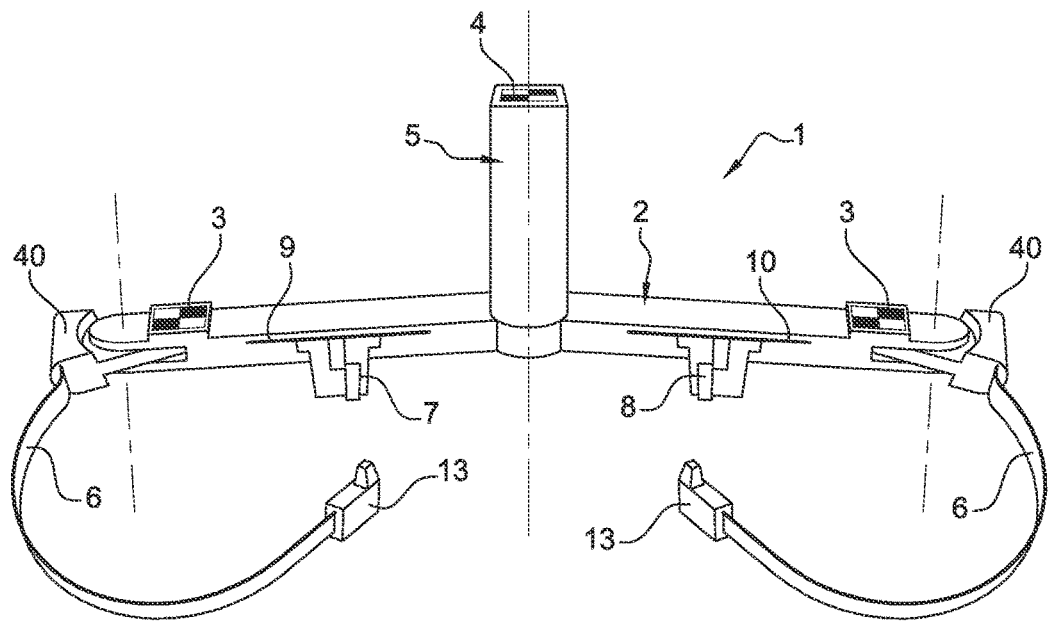
FIG. 1 is a perspective view of a locating device according to the invention.

With reference to FIG. 1, a locating device according to the invention consists of a locating clip 1 comprising a main bar 2, three fixed markers 3, 4, a central extension 5, two lateral lever arms 6 and two sliding shoes 7, 8. The bar 2, which may be considered to be the upper part of the clip 1, is straight and has two aligned slideways 9, 10 which extend along a longitudinal axis of said bar 2 and in which the two shoes 7, 8 can slide. The bar 2 can be notionally divided into two half-bars and each slideway 9, 10 is then situated in a central area of each of the half-bars. The central points of the two slideways 9, 10 are separated from one another by around 55 mm and the length of each slideway 9, 10 is around 25 mm. Each shoe 7, 8 has an upper mount 30 in which two lower legs 31, 32 that form a free space between one another are implanted, said mount 30 being designed to slide in a slideway 9, 10 of the bar 2, and said legs 31, 32 being aligned in a vertical plane perpendicular to a longitudinal axis of the slideway 9, 10. Preferentially, the two legs 30, 31 are disposed with respect to one another such that they diverge with increasing distance from the mount 30. One 32 of the two legs is implanted in the mount 30 so as to be positioned perpendicularly to the bar 2, said leg 32 then acting as an abutment for the frame in order to avoid any misalignment of the clip 1 with respect to said frame. Those areas of each leg 30, 31 that face one another are covered with a nonslip material. The central extension 5 is implanted at the center of the bar 2 and extends toward the front of said bar 2 like a projection. The central extension 5 may form an added component with respect to the bar 2 or else may form a single component with said bar 2. The clip has three fixed and identical markers 3, 4, of which two 3 are positioned at the two ends of the bar 2 and the third is placed on the free end of the central extension 5. The three markers 3, 4 are inscribed in three parallel planes placed on the front face of the clip 1. Each fixed marker 3, 4 is formed by a square divided into four identical smaller squares, the two squares 11 of one diagonal being darker than the squares 12 of the other diagonal. Preferentially, each fixed marker 3, 4 is realized by a mini checkerboard having two black squares 11 and two white squares 12 which cross one another. However, these markers may use other colors, for example light gray and dark gray.

Figures 2A, 2B:
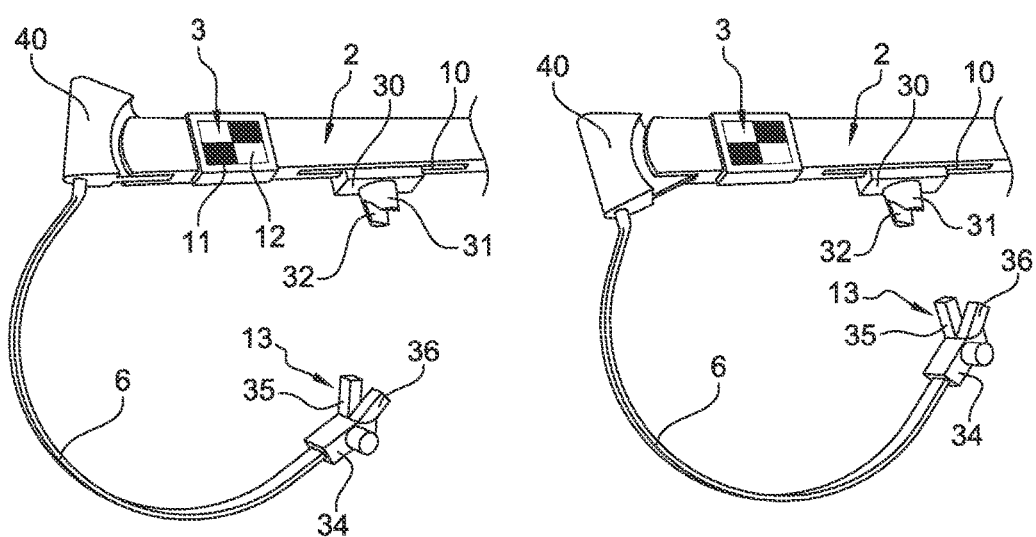
FIG. 2a is a perspective view of one end of a locating device according to the invention, showing a lever arm in a first position.
FIG. 2b is a perspective view of one end of a locating device according to the invention, showing a ever arm in a second position.

With reference to FIGS. 2a and 2b, the clip 1 has two lateral lever arms 6 with a rounded shape, said lever arms 6 being implanted in the distal part of each of the two ends of the bar 2. These two lever arms 6 are curved toward the inside of the clip 1 and each end in a secondary nonslip shoe 13 that is intended to come into contact with the lower edge of the frame. These two secondary nonslip shoes 13 each have a lower mount 34 and two upper legs 35, 36 that form a free space between one another, said legs 35, 36 being aligned in a vertical plane perpendicular to a longitudinal axis of the bar 2. Like the upper shoes 7, 8, one 35 of the two legs is implanted in the mount 34 so as to be positioned perpendicularly to the bar 2, said leg 35 then acting as an abutment for the frame in order to avoid any misalignment of the clip 1 with respect to said frame. More precisely, the leg 35, implanted perpendicularly to the bar 2, of a lower shoe 13 is aligned with the leg 32 of the upper shoe 7, 8 corresponding thereto, said leg 32 itself being implanted perpendicularly to the bar 2. Each arm 6 consists of a narrow strip of metal having a small thickness and can advantageously be represented by a steel leaf spring. Each lever arm 6 is connected to the bar 2 by way of a segment 40 mounted in an articulated manner about an axis perpendicular to a longitudinal axis of said bar 2. Specifically, each lever arm 6 is rigidly fixed to the segment 40, which is itself mounted rotatably on the bar 2. In this way, with reference to FIG. 2a, each arm 6 may adopt a first wide open position in which the secondary shoe 13 is away from the bar 2 and, with reference to FIG. 2b, it may also take up a second, more closed position in which said secondary shoe 13 has been moved toward said bar 2, the two positions being inferred from one another by a simple rotation. Each rotary segment 40 is designed to remain blocked on the bar 2 in each of its two positions. By virtue of this positioning flexibility that is made possible both by the elastic deformation of the lever arms 6 and by the possibility of taking up these two distinct positions, the clip 1 according to the invention can laterally clamp a wide range of frames of greater of lesser width, and having lenses with variable heights. It should be noted that each lever arm 6 is configured for the secondary nonslip shoe 13 located at its end to be positioned perpendicularly to each sliding shoe 7, 8 of the bar 2 when the clip 1 is mounted on the frame. The sliding shoes 7, 8 and the secondary shoes 13 corresponding thereto thus define two parallel axes that each pass through each pupil of the individual or the immediate vicinity thereof. It should be emphasized that each arm 6 is deformable in the plane of the frame in order to adapt to a given frame size, but it remains nondeformable in a direction perpendicular to said plane of the frame. In this way, the arms 6 help to keep the frame in a natural position which it would adopt on the face of an individual in the absence of said clip 1.

Figure 2C:
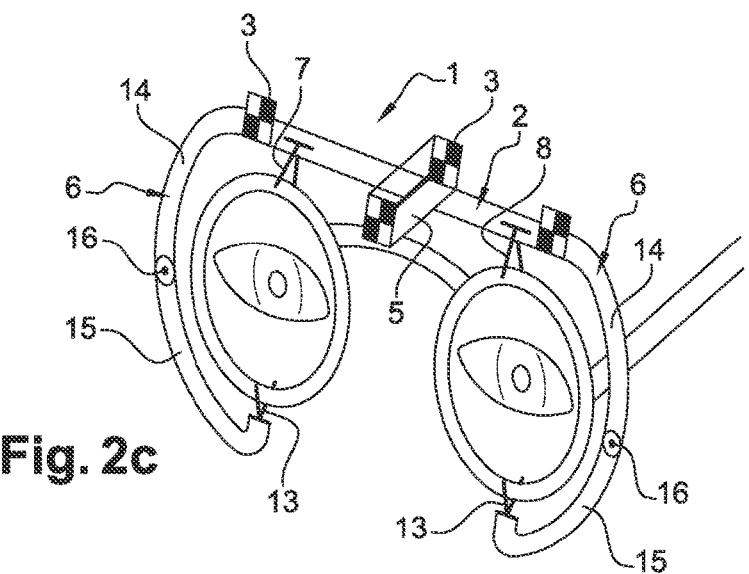
FIG. 2c is a perspective view of one end of another preferred embodiment of a locating device according to the invention.

With reference to FIG. 2c, each lever arm 6 may be formed from two curved parts 14, 15, one next to the other, the first part 14 being mounted rotatably on the bar 2 and the second part 15 being mounted rotatably at a pin 16 located at the free end of said first part 14. Said parts 14, 15 are arranged so as to be curved in the same direction, the second part 15 ending with a nonslip shoe 13. This additional articulation between the two constituent parts 14, 15 of each lever arm 6 thus increases the number of possible configurations of use of a dip 1 according to the invention and increases the precision of contact between said dip 1 and the frame in question.

Figure 3:
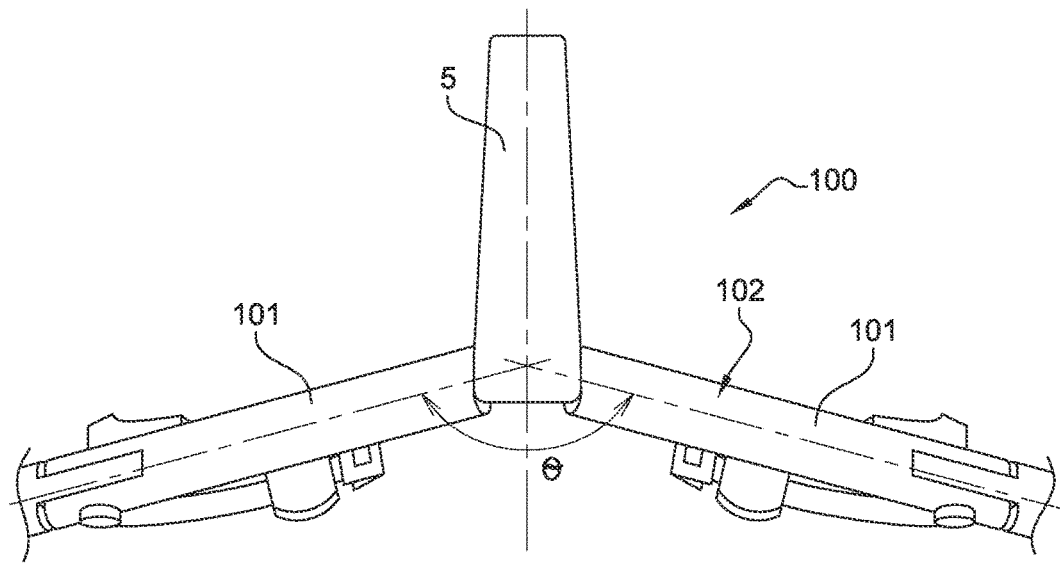
FIG. 3 is a perspective view of a third preferred embodiment of a locating device according to the invention.

With reference to FIG. 3, a second preferred embodiment of a dip 100 according to the invention may have a bar 102 consisting of two rectilinear segments 101 which are the same length but are not aligned. Specifically, some current pairs of spectacles have a curved profile for adhering as closely as possible to the face of an individual. However, for this type of frame, a dip 1 having a straight bar 2 appears not to be very suitable for precisely representing the curved frame in space. For this reason, the geometry of the dip 100 has been modified such that the two segments 101 of the bar 102 follow the curved profile of said frame as closely as possible. In this way, the bar 102 and the central extension 5 are positioned in the same plane, said extension 5 originating at the junction point of the two segments 101 and extending away from said segments 101 along an axis of symmetry passing between said segments 101. Preferentially, the angle θ between the two segments 101 is between 180° and 130°.

Thus, a clip 1, 100 according to the invention may have either a straight bar 2 or a bar 102 having two inclined segments 102. According to another preferred embodiment of a clip according to the invention, the dip may have a bar made of two parts that are connected together in an articulated manner. In this way, the clip may adapt easily and precisely both to a frame with no curvature and to a frame having a large curvature.

Figure 4:
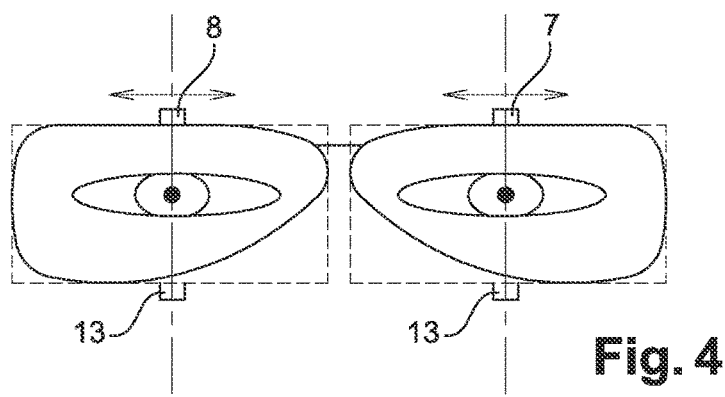
FIG. 4 is a schematic front view of a frame equipped with a locating device according to the invention, and showing the position of the shoes with respect to the pupils of an individual.

With reference to FIG. 4, the nonslip shoes 7, 8 are moved along the bar 2 of the clip 1 so as to be positioned perpendicularly to each pupil of the individual In other words, once the frame equipped with the clip 1 is being worn on the more or less vertical face of the individual, each shoe 7, 8 is set so as to be positioned in a manner aligned with each pupil of the individual along a vertical axis 16, 17.

Figure 5A:
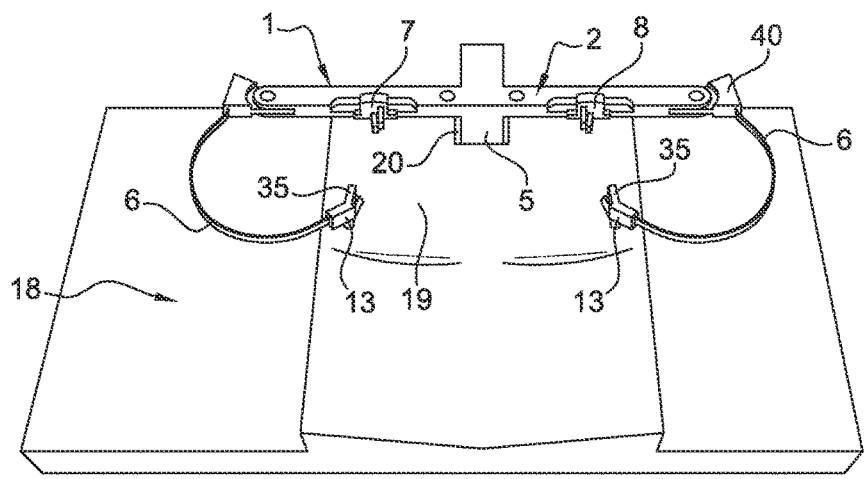
FIG. 5a is a perspective view of a support according to the invention for a locating device according to the invention.

With reference to FIG. 5a, the clip 1 according to the invention is placed on a support 18 the geometry of which is designed to make it easier to mount said clip 1, 100 on a frame. The support 18 has a planar contact face 19 provided with an orifice 20. The clip 1, 100 is placed against the support 18 such that the central extension 5 is placed in the orifice 20 and such that the plane in which the bar 2 and the two lever arms 6 are inscribed is parallel to the planar contact face 19 of said support 18. This support 18 is intended to store the dip 1, 100 between two measurement processes, in a position which will make it easier to mount it on a pair of spectacles.

Figure 5B:
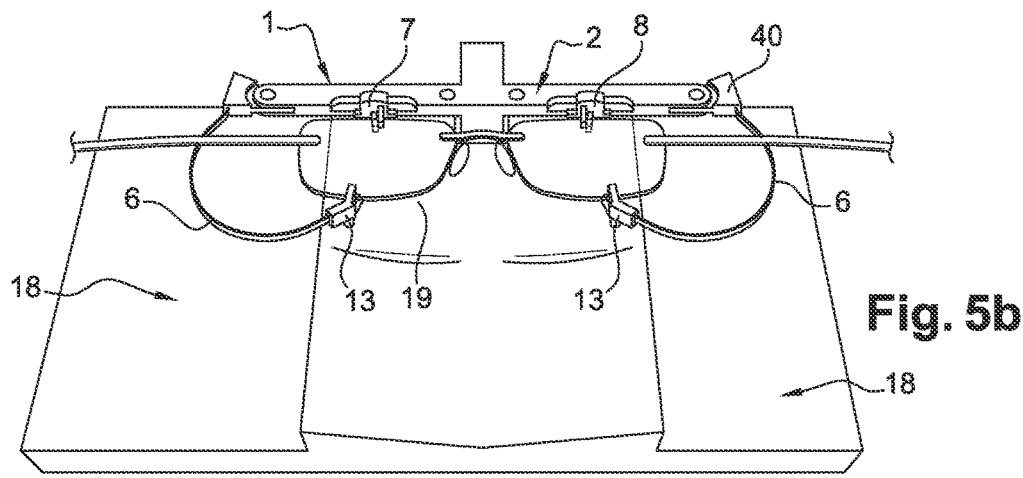
FIG. 5b is a perspective view of the support from FIG. 5a, illustrating a first step in a method for mounting a locating device on a frame.
Figure 5C:
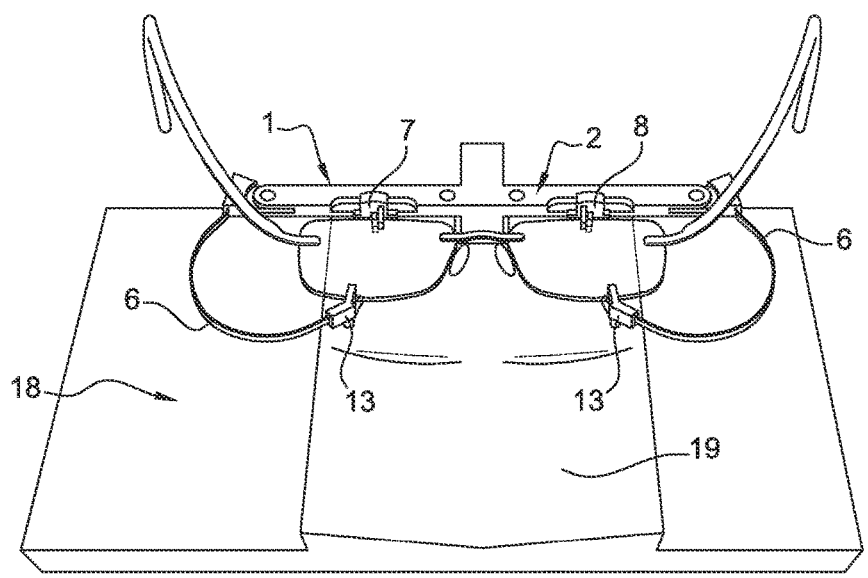
FIG. 5c is a perspective view of the support from FIG. 5a, illustrating a second step in a method for mounting a locating device on a frame.

Specifically, a method for mounting a clip 1 according to the invention, said clip 1 having been previously placed on a support 18 according to the invention, comprises the following steps of:

manually grasping the frame at its temples, then carrying said frame to the clip 1 held against the support 18,
  with reference to FIG. 5b, presenting the frame in an inclined position with respect to the clip 1 in order to insert the upper part of said frame into the two nonslip shoes 7, 8 of the clip 1,
  with reference to FIG. 5b, rotating the frame until its lower part is inserted into the secondary shoes 13 of each lever arm 6, the upper part of said frame being held in the nonslip shoes 7, 8. In this way, the upper part of the frame which is inserted into the nonslip shoes 7, 8 will act as an axis of rotation for the frame for the insertion thereof into the secondary shoes 13.

once the lenses of the frame are positioned parallel to the contact face of the support 18, removing the frame equipped with the clip 1 by sliding the central extension 5 out of the orifice 20.

The invention also relates to a mounting kit in the form of a box which houses a support 18 and two locating dips 1 for covering the entire range of possible curvatures of a pair of spectacles. In this way, the two segments 101 of the bar 102 of a first clip 1 form a fixed angle of between 180° and 170° with one another, said angle being preferentially equal to 175°, said first clip 1 being provided for frames with very little curvature. The two segments 101 of the bar 102 of the second clip 1 form a fixed angle of between 145° and 155° with one another, said angle being preferentially equal to 150°, said second clip 1 being designed to be fixed to a very curved frame. The support 18 comprises two distinct positions for said clips, the first position being realized by a planar contact face 19 provided with an orifice 20 for receiving the virtually rectilinear first clip 1, the second position being characterized by a contact face made of two inclined planar parts and by an orifice situated at the central ridge connecting said parts, said second position being shaped to receive the highly inclined second clip 1. The second clip 1 is positioned in the support 18 such that each segment 101 of the bar 102 of said clip 1 is positioned parallel to an inclined planar part of the contact face of said support 18.

The invention claimed is:

1. A locating device configured to be fixed to a spectacle frame to spatially locate said frame, said device comprising:
   a transverse bar provided with
      two rectilinear slideways that extend along a longitudinal axis of the transverse bar, and
      two mobile fixing members, each of the mobile fixing members being freely movable along a respective slideway to form points of contact between the locating device and the spectacle frame in order to attach the locating device to the spectacle frame, each mobile fixing member being configured to move on the locating device so that the locating device is able to be fixed to the spectacle frame that has a specific curvature and lens height and is positioned at the level of pupils of a user;
   a central extension extending from the transverse bar;
   two lateral markers disposed at the transverse bar and a central marker disposed at the central extension, each of the markers having a light area and a darker area; and
   two lateral lever arms that are each disposed at one end of the transverse bar, each of said lever arms being deformable in the plane of the frame to adapt to a given frame length, and being non-deformable in a direction perpendicular to said plane, each arm consisting of a narrow strip of metal that is elastically deformable.

2. The locating device as claimed in claim 1, wherein the two fixing members are adjustable independently of one another in order to represent the position of each pupil.

3. The locating device as claimed in claim 1, wherein each mobile fixing member is a shoe provided with a nonslip material, and
   each of said shoes is configured to come into contact with the upper part of the frame.

4. The locating device as claimed in claim 3, wherein each shoe has two legs that are configured to be positioned on each side of the frame, and
   the nonslip material is disposed on areas of each leg that are opposite one another.

5. The locating device as claimed in claim 1, wherein each lever arm ends with a secondary non-slip shoe that is configured to come into contact with the lower part of the frame, and
   each shoe has two legs that are configured to be disposed on each side of the frame.

6. The locating device as claimed in claim 5, wherein one leg of each upper shoe and one leg of each lower shoe is disposed perpendicularly to the bar to avoid a misalignment between said device and the frame.

7. The locating device as claimed in of claim 1, wherein each lever arm has a rounded shape and is mounted to pivot on the bar.

8. The locating device as claimed in claim 7, wherein each lever arm is mounted rotatably on the bar by a connecting segment that is configured to take two rotational positions.

9. The locating device as claimed in claim 1, wherein the bar has two rectilinear segments which have an identical length and form an angle between one another, and
   said two angled segments and the central extension are disposed in the same plane.

10. The locating device as claimed in claim 9, wherein the angle between the two segments is between 180° and 130°.

11. A support for use with a locating device as claimed in claim 1, said support comprising:
    at least one face that is provided with an orifice configured to receive the central extension of said device,
       wherein said device is disposed against the support such that the plane in which the bar and two lever arms are inscribed is positioned parallel to said face.

12. The support as claimed in claim 11, further comprising a retaining device configured to retain said locating device.

13. A method for mounting a locating device as claimed in claim 1 on a frame, said method comprising:
    fixing said device to a support, the support having at least one face that is provided with an orifice configured to receive the central extension of said device, said device being placed against the support such that the plane in which the bar and two lever arms are inscribed is positioned parallel to said face;
    manually grasping the frame at temples thereof, then carrying said frame to the locating device held against the support;
    presenting the frame in an inclined position with respect to a clip in order to insert the upper part of said frame into two nonslip shoes of the locating device;
    rotating the frame in order to insert a lower part thereof into the secondary shoes of each lever arm; and
    removing the frame equipped with the locating device.

14. The locating device as claimed in claim 1, wherein the mobile fixing members extend downwardly from the transverse bar.

15. The locating device as claimed in claim 1, wherein the mobile fixing members are buttons provided at the transverse bar that are small in relation to the length of the transverse bar, the mobile fixing members being configured to be inserted between the transverse bar and the spectacle frame.

* * * * *